United States Patent [19]

Ara et al.

[11] Patent Number: 5,106,675
[45] Date of Patent: Apr. 21, 1992

[54] NONAQUEOUS COATING COMPOSITION AND COATED METAL

[75] Inventors: Masayasu Ara; Akira Katoh; Takeharu Umezu, all of Hiratsuka, Japan

[73] Assignee: Nihon Parkerizing Co., Ltd., Tokyo, Japan

[21] Appl. No.: 627,652

[22] Filed: Dec. 14, 1990

[30] Foreign Application Priority Data

Dec. 29, 1989 [JP] Japan ................. 1-342218

[51] Int. Cl.$^5$ .............................................. B32B 7/02
[52] U.S. Cl. ...................................... 428/219; 106/14.37; 428/423.1; 428/457; 428/461
[58] Field of Search ................ 106/14.37, 14.41; 427/44; 428/400–550, 219

[56] References Cited

U.S. PATENT DOCUMENTS 4,745,003  5/1988  Sirkoch et al. .................. 427/54.1

FOREIGN PATENT DOCUMENTS

| | | |
|---|---|---|
| 57-68176 | 4/1982 | Japan .................. 106/14.42 |
| 60-203677 | 10/1985 | Japan . |
| 61-133274 | 6/1986 | Japan . |
| 61-227178 | 10/1986 | Japan . |
| 61-227179 | 10/1986 | Japan . |
| 61-279687 | 12/1986 | Japan . |

Primary Examiner—William R. Dixon, Jr.
Assistant Examiner—Margaret V. Einsmann
Attorney, Agent, or Firm—Ladas & Parry

[57] ABSTRACT

A nonaqueous coating composition comprising a urethane resin, at least one selected from a paraffin wax, a polyethylene wax, a fatty acid amide and a fatty acid amide derivative, and an organic solvent; a nonaqueous coating composition comprising the above components and additional silica; and a coated metal having a specific build-up of a coating formed of one of the above nonaqueous coating compositions.

16 Claims, 1 Drawing Sheet

NONAQUEOUS COATING COMPOSITION AND COATED METAL

BACKGROUND OF THE INVENTION

This invention relates to a nonaqueous coating composition which has very low solubility to a film formed by a metal surface treatment such as chromate treatment and phosphate treatment, which forms, as a metal surface treating composition, a film having alkali resistance to degreasing with an alkali and solvent resistance to degreasing with a solvent, and which imparts a metal with formability free from application of a press oil to the metal, corrosion resistance, adhesion to a overcoating and resistance to stains such as a finger mark.

Further, this invention relates to a coated metal which is coated with a defined coating amount of the above coating composition and has excellent cationic electrodeposition coatability ("electrodepositability" hereinafter) and electric resistance weldability ("weldability" hereinafter) as well as the above characteristics.

In metal working and metal coating fields, for the purpose of improvement in corrosion resistance and adhesion to a coating composition, it is conventionally general practice of a metal worker and a metal coater to subject a metal material such as steel, aluminum, zinc, tin, copper and an alloy thereof and a material plated on these metals to a surface treatment such as chromate treatment, phosphate treatment and anode electrolytic treatment after the metal material is processed or before the metal material is coated. In recent years, for the purpose of labor saving at a processing step and cost reduction, metal material manufacturers make an attempt to obviate a metal worker's and metal coater's requirement of such a surface treatment by putting a preliminarily surface-treated metal material on the market. Such a preliminary surface treatment is typically carried out by treating a metal material with a conversion type chromate, washing the metal material with water and coating it with a chemical which mainly contains an organic resin, or by coating a metal material with an aqueous resin into which a chromate chemical is incorporated. A film formed by such a surface treatment not only has characteristic feature in that it not easily stained with a finger mark or a finger mark can be easily wiped off, but also has characteristic features in that it has excellent corrosion resistance, excellent adhesion to an overcoating and excellent resistance to degreasing (a film is dissolved only a little by alkali degreasing and solvent degreasing, and a decrease in performance hardly occurs). Since, however, a coating produced by such a surface treatment method lacks sufficient lubricity, elongation property and adhesion, a surface treated metal having such a coating cannot be directly formed. Therefore, such a surface treated metal is formed after a step of applying a press oil, or the like is carried out. However, such a step further requires a complicated step for removing the applied press oil, or the like by degreasing before sending the metal to a next step. In order to omit such a complicated step, attempts have been made to develop a surface treating composition which permits the formation of a metal material without applying a press oil, or the like and has excellent corrosion resistance and excellent adhesion to an overcoating.

Prior techniques as such an attempt are disclosed in (1) Japanese Patent Kokai (Laid open) (JP-A hereinafter)-61-60766, (2) JP-A-61-227178, JP-A-61-227179, JP-A-61-231177, JP-A-61-279687, JP-A-62-33781, (3) JP-A-63-83172, (4) JP-A-62-289274 and (5) JP-A-63-162886, and such techniques are summarized below. That is, the invention of the publication (1) relates to an aqueous composition which mainly comprises an organic-inorganic composite reaction product containing a water-soluble or water-dispersible organic resin, an alkoxysilane compound and silica and a lubricant. A film formed of this composition mainly comprises the organic-inorganic reaction product, and this film has defects in that it is inferior in flexibility and adhesion to a metal and that the formability thereof is insufficient. The inventions of the publications grouped as (2) disclose a composition comprising a matrix of an acrylic aqueous resin as an organic resin and fine particles of graphite or molybdenum disulfide or a mixture of these with at least one of a paraffin oil, a silicon oil and a neopentylpolyol fatty acid ester. However, a film of this composition has a problem in that it is liable to cause coating failure and adhesion failure due to its repellency to water and oil when it is overcoated with another coating composition. The inventions of the publications grouped as (3) disclose a composition which is formed by incorporating an electrically conductive substance, a chromium compound and a lubricant substance to a composition comprising an organic resin selected from an epoxy resin, a polyester resin and an acrylic resin, and an amino resin or a polyisocyanate as a curing component. When the electrically conductive substance is carbon black or graphite, the resultant film has a color tone of black only, and the use thereof is limited. When the electrically conductive substance is a metal powder, semiconductor oxide or iron phosphide, the film does not exhibit sufficient formability. The publication (4) discloses a technique which comprises forming a coating layer composed mainly of a composite or mixed material of a urethane resin and silicon dioxide or a coating layer composed mainly of a substance prepared by incorporating a zinc powder into the above composite or mixed material. However, the use of these material is not sufficient to obtain full formability. The publication (5) discloses an organic film comprising a carboxylated polyolefin resin, a liquid epoxy resin, a fluorine resin and silica. Since, however, a fluorene resin has repellency to water and oil, the resultant film causes coating failure or adhesion failure when another film is coated thereon. Further, when the resin composition disclosed in the publication (5) is coated on a chromate undercoating layer formed by carrying out an undercoating treatment using a roll on type chromate, a chromium compound is eluted from the undercoating layer into this resin composition when the resin composition is applied since said resin composition is aqueous. Thus, said resin composition has a problem in that it is unstabilized.

SUMMARY OF THE INVENTION

It is an object of this invention to provide, in order to overcome the above problems, a composition which hardly causes elution from an undercoating layer to the composition even when the composition for metal surface treatment is applied to a film formed by chromate treatment or a phosphate treatment on a metal surface or has excellent stability in treatment, which is capable of imparting a metal material with formability, high corrosion resistance, excellent adhesion to an overcoating composition and resistance to stains such as finger marks, and which does not suffer a decrease in the above properties through a step of alkali degreasing or solvent degreasing.

Further, it is another object of this invention to provide a coated metal having excellent electrodepositability and weldability in addition to the above properties.

The present inventors have made a diligent study to overcome the foregoing problems, and completed a first embodiment of the invention (abbreviated as "first embodiment" hereinafter), which is a nonaqueous coating composition comprising a urethane resin, at least one member selected from a paraffin wax, a polyethylene wax, a fatty acid amide and a fatty acid amide derivative and an organic solvent, and a second embodiment of the invention (abbreviated as "second embodiment" hereinafter), which is a nonaqueous coating composition comprising a urethane resin, at least one member selected from a paraffin wax, a polyethylene wax, a fatty acid amide and a fatty acid amide derivative, silica and an organic solvent.

Further, the present inventors have found it possible to obtain a coated metal having excellent electrodepositability and weldability as well by limiting an application amount of said composition to 0.5 to 3.0 g/m² as a dry film coating weight, and completed a third embodiment of the invention (abbreviated as "third embodiment" hereinafter), which comprises a metal coated with the composition of the first embodiment and a fourth embodiment of the invention (abbreviated as a "fourth embodiment" hereinafter which comprises a metal coated with the composition of the second embodiment).

DETAILED DESCRIPTION OF THE INVENTION

Figure 1:
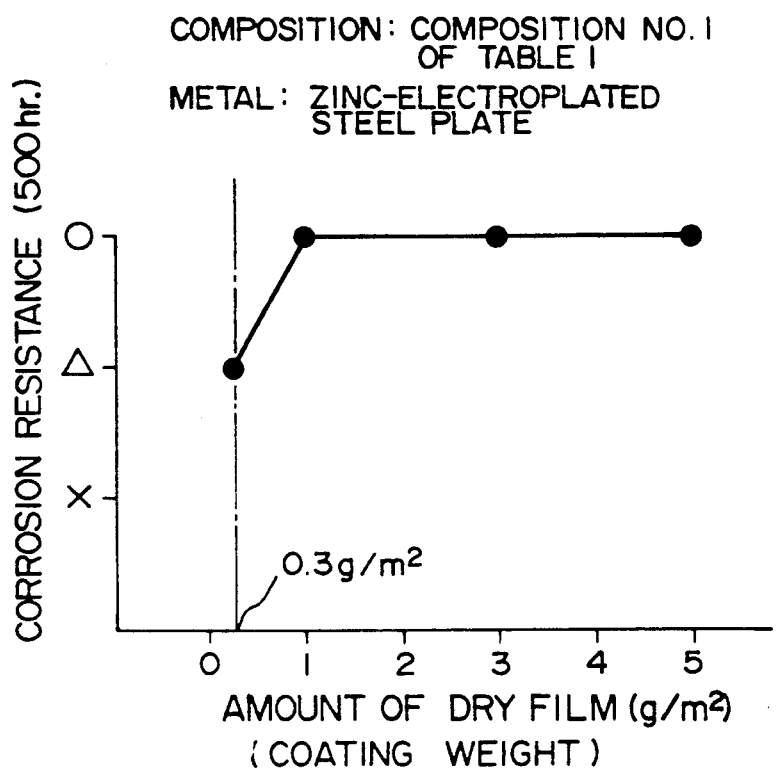
FIG. 1 shows the relationship between coating weight and each of performances (corrosion resistance and electrodepositability) in a coated metal of this invention.
Figure 1:
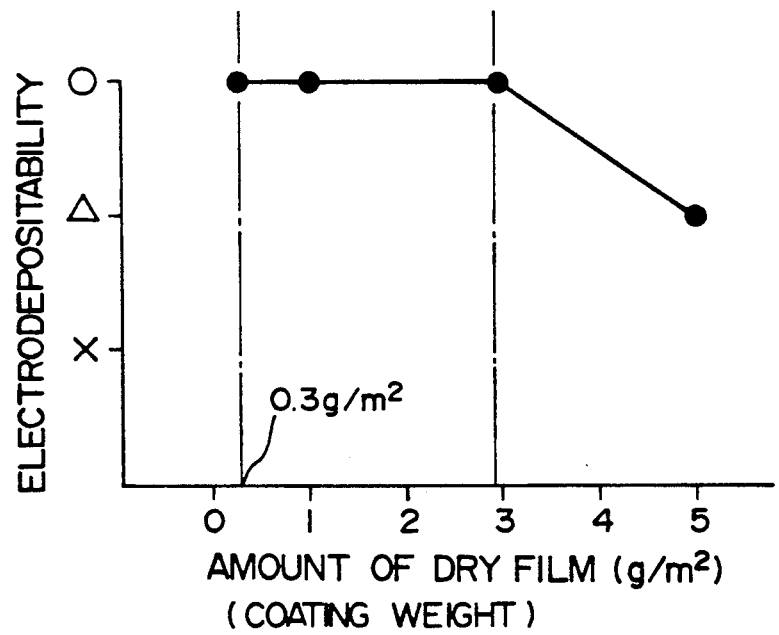

The composition of the first embodiment is detailed first. The urethane resin is not specially limited. However, particularly preferred are (1) a one-package thermosetting type resin comprising a blocking agent and (2) a two-package polyol curing type resin.

The one package thermosetting type urethane resin comprising a blocking agent is a product prepared by blocking the isocyanate group of the following isocyanate compound with a monofunctional blocking agent including phenol, cresol, an aromatic secondary amine, a tertiary alcohol, a lactam or an oxime.

Examples of the isocyanate compounds are aromatic diisocyanates including tolylene diisocyanate diphenylmethanediisocyanates and xylylene diisocyanate and alicyclic isocyanates which are hydrogenation derivatives of these; aliphatic and alicyclic isocyanates including hexamethylene diisocyanate and isophorone diisocyanate, and dimers and trimers of these; and reaction products prepared by reacting these isocyanate compounds with polyether polyols or polyester polyols.

Examples of the above polyether polyols are polyols and polyoxytetramethylene glycol which are adducts of low molecular weight glycols including ethylene glycol, propylene glycol, bisphenol A, etc., with ethylene oxide or propylene oxide.

Examples of the above polyester polyols are polyesters prepared by a dehydration and condensation reaction between low molecular weight glycols and dibasic acids, and lactone polyols prepared by ring-opening polymerization of lactones including ε-caprolactone in the presence of a low molecular weight glycol.

The two-package curing type resin is used by formulating the above isocyanate compound and the above polyester polyol or polyether polyol when applied.

Of the above urethane resins, particularly preferred are those which contain a hydroxyl group, a tertiary amino group or the like with a blocked isocyanate group in the same molecule. These urethane resins may be produced in various methods. In general, they are produced by reacting a polyol having a tertiary amino group with an isocyanate compound having at least one blocked isocyanate group and at least one free isocyanate group.

Examples of an aminated polyol used in this case are alkylene oxide adducts of polyalkylenepolyamines prepared by reacting trialkanol amines including triethanolamine, tripropanolamine, tributanolamine or the like, ethylenediamine, diethylenetriamine or hexamethylenediamine with ethylene oxide, propylene oxide or butylene oxide; and reaction products prepared by adding an alkylene oxide to an alicyclic or aromatic polyamine including di(methylamino)cyclohexane or xylylenediamine.

Further, the following are usable as a polyol having a tertiary amino group: a reaction product between the above aminated polyol and a diisocyanate compound, a reaction product between the above aminated polyol (e.g. a reaction product between 2 mol of triethanolamine and tolylene diisocyanate), and an adduct of a epoxy resin with a dialkanolamine (e.g. an adduct of 2 equivalent weight of an epoxy resin with 2 mol of diethanolamine). In addition, in order to modify the film of the composition of this invention, a small amount of a suitable resin other than the urethane resin may be incorporated into the composition. The formability improver to impart formability is limited to a polyethylene wax, a paraffin wax, a fatty acid amide and a fatty acid amide derivative. Examples of the polyethylene wax are a high pressure process low molecular weight polyethylene, a pyrolysis product of low density polyethylene, a by-product of low pressure process polyethylene, low pressure direct polymerization process polyethylene, and those of which the molecule contains a carboxylic acid or hydroxyl group introduced under an oxidation method, etc. The paraffin wax is one type of petroleum waxes, and obtained from a light-gravity fraction of paraffin base crude oil. The fatty acid amide is that which is produced by introducing an amide group into a higher fatty acid including stearic acid, oleic acid, linolenic acid, etc., and usually used as an amidation product of a mixture of these higher fatty acids. The fatty acid amide derivative is a reaction product between p-formaldehyde and a fatty acid amide. The above solid formability improvers may be used alone, or they may be used in combination to further improve the formability.

As a silica which is the third component of this invention, a commercially available nonaqueous silica sol and a fumed silica can be used. Examples of the nonaqueous silica sol include a silica sol formed by replacing a dispersion medium of a water-dispersed silica sol with an organic solvent including isopropanol, butanol, ethylene glycol, monoethyl ether or xylene. Examples of the fumed silica include Aerosil 200, R-972 supplied by Nippon Aerosil K.K.

The amount of the solid formability improver for use is preferably 3 to 40% by weight based on the total solid content. When this amount is less than 3% by weight, no sufficient lubricating effect can be obtained. When it is more than 40% by weight, the resultant coating composition exhibits degraded corrosion resistance and degraded adhesion to an overcoating.

In the first embodiment, the amount of the urethane resin is defined depending upon the amount of the solid formability improver. That is, the amount of the urethane resin is 97 to 60% by weight based on the total solid content. In the second embodiment, the amount of the urethane resin is required to be not less than 50% by weight based on the total solid content. When said amount is less than 50% by weight, all of the formability, corrosion resistance and adhesion to an overcoating are degraded. When said amount is not less than 50% by weight, such an amount is defined depending upon the amounts of the solid formability improver and the silica. The upper limit thereof is 94% by weight.

The amount of the silica in the second embodiment is preferably 3 to 40% by weight based on the total solid content, although said bound is not specially limited. When this amount is less than 3% by weight, no sufficient effect can be produced on improvement in corrosion resistance. When said amount is more than 40% by weight, the lubricity of the resultant formed film is liable to be impaired. Further, when the formed film is subjected to an alkali degreasing step, the formed film is liable to show a decrease in corrosion resistance to a great extent.

The nonaqueous coating composition of this invention may contain various additives which are generally incorporated into a coating composition to such an extent that the intended performances thereof are not impaired. Examples of such additives are an extender pigment, a coloring pigment, a rust preventing agent, a pigment dispersant, an anti-settling additive, an antifoamer, a leveling agent, an antioxidant, a thickener, and the like.

The solvent to be used is not specially limited, and any solvent is usable as far as it can dilute or disperse the urethane resin, the solid formability improver and silica. The composition of this invention having a suitable concentration and a suitable viscosity can be prepared by incorporating such a solvent.

Examples of metals which can be formed into suitable coated metals by coating them with the composition of this invention are iron, zinc, aluminum, tin, copper, an alloy of each of these (with at least one, for example, of aluminum, chromium, silicon, cobalt, zirconium, tin, titanium, iron, lead, nickel, magnesium, manganese and molybdenum), and materials for plating these.

Further, in order to improve corrosion resistance and adhesion to an overcoating, it is preferred to subject a surface of the above metals conventional surface treatment such as phosphate treatment, chromate treatment or anode treatment prior to coating the surface with the composition of this invention.

The form of the metal is not specially limited, and the metal may have a form of a plate, a coil, a bar, a wire, or the like. The composition of this invention may be coated on the metal according to a known method such as brushing, spray coating, roll coating, immersion, etc. The method for drying and curing the composition of this invention after applied is not specially limited, and an infrared furnace, a high frequency furnace, etc., can be used. The dry coating weight is preferably 0.5 to 3.0 g/m$^2$. When the dry coating weight is less than 0.5 g/m$^2$, the formability, corrosion resistance and resistance to stains such as a finger mark are particularly insufficient. When the dry coating weight is more than 3.0 g/m$^2$, the resultant film shows a decrease in electric conductivity to a great extent and a decrease in weldability and electrodepositability. On the basis of finding of the above data, the third and fourth embodiments were completed.

FIG. 1 demonstrates the effects of the third and fourth embodiments or shows the relationship between dry coating weight and each of performances (corrosion resistance and electrodepositability) in a coated metal according to these embodiments. That is, when the dry film coating weight is less than 0.5 g.m/$^2$, the corrosion resistance of the resultant film is inferior, and when it is more than 3.0 g/m$^2$, the electrodepositability of the resultant film is inferior.

As described above, the film formed from the composition of this invention is excellent in formability, adhesion to an overcoating and stability at a coating time over conventional surface treatment film.

The above excellent properties have been achieved as a result of tremendous experiments, i.e. studies of organic resins, studies of formability improvers and experiments of these components in combination. However, a full explanation cannot be necessarily given to these effects. As far as the formability is concerned, the high formability is presumably achieved on the basis of a synergistic effect produced by the molecular structure of the urethane resin and the properties of the solid formability improver of this invention.

Concerning forming mechanism, it is considered, in general, that when a lubricant such as a press oil, etc., is used, the forming process is possible since the lubricant forms a micropool to prevent pseudo-adhesion in a boundary lubricating portion. In this invention, it is considered that the solid formability improver such as a paraffin wax, etc., is melted due to exotherm at a forming time to form a micropool. The mode of forming the micropool is determined depending upon properties of the formability improver used and properties of a resin to contain the solid formability improver in a film. The following points are therefore considered to be important: melting point and chemical properties of the solid formability improver, extendibility of a resin and adhesion of a resin to a substrate, and a degree of compatibility between the solid formability improver and a resin when a film is formed. The coatability and adhesion of an overcoating are properties which are decreased to a great extent when a lubricant is incorporated. The film formed according to this invention is assumed to have a structure in which the film surface is not wholly covered with the formability improver and is only partially exposed. These properties are also achieved only when the formability improver and the urethane resin according to this invention are used. Further, concerning the stability at a coating time, the solubility of inorganic compounds such as chromic acid, a chromium compound and phosphates eluted from a chromate film or a phosphate film as an undercoating for the composition of this invention to the composition of this invention is remarkably decreased. For this reason, the composition of this invention is not destabilized by inclusion of these compounds, and has excellent stability at a coating time.

The thickness of a film is considered to be a large factor to control cationic electrodepositability and weldability. The cationic electrodepositability of the composition of this invention is excellent. The reason therefor is presumably that the urethane resin is a cationic resin and a current of charges easily takes place in a film formed of the composition of this invention at a time of cationic electrodeposition in which a substance to be coated works as a cathode. The weldability is also considered to be excellent due to good electrical conductivity for the same reason.

DESCRIPTION OF THE PREFERRED EMBODIMENTS

Embodiments of this invention will be explained hereinafter.

(1) Preparation of compositions of this invention (present composition Nos. 1 to 8) and comparative compositions (Nos. 9 to 17).

(1)-i: Preparation of the present composition (No. 1).

24.6 Grams of a urethane resin (Mitec Coat BL 100, supplied by Mitsubishi Chemical Industries, Ltd., a urethane resin having at least one blocked isocyanate group, at least one hydroxyl group and at least on tertiary amino group in one molecule, nonvolatile content: 65%) and 26.7 g of a dispersion of a paraffin wax (nonvolatile content: 15%) in a solvent, prepared in the following manner, were mixed with each other, and 48.7 g of Solvesso 150 (supplied by Esso Standard Oil Co., Ltd.) as a diluent was added to give a nonaqueous coating composition having a nonvolatile content of 20%. The dispersion of a paraffin wax in a solvent had been prepared by dissolving 15 g of a paraffin wax (trade name 155, m.p. =70° C., supplied by Nippon Seiro K.K.) in 85 g of ethyl acetate under heat and reflux, and cooling the resultant mixture to 25° C.

(1)-ii: Preparation of the present composition (No. 3).

18.5 Grams of Mitec Coat BL 100, 26.7 g of the same dispersion of a paraffin wax in a solvent as that prepared above, and 20 g of a nonaqueous solvent type silica sol (Organosilica sol XBA-ST, supplied by Nissan Chemical Industries, Ltd., nonvolatile content: 20%) were mixed, and 34.8 g of Solvesso 150 (supplied by Esso Standard Oil Co., Ltd.) as a diluent was added to the mixture to give a nonaqueous coating composition having a nonvolatile content of 20%.

(1)-iii: Preparation of the present compositions (Nos. 2 and 4 to 8) and comparative compositions (Nos. 9 to 17).

Each of the present compositions and the comparative compositions was prepared by mixing an organic resin, a lubricant and optionally a rust preventer all shown in Table 1 in the same way as in the preparation of the present composition (No. 1).

(2) Preparation of a metal coated with the present composition and a metal coated with a comparative composition.

(2)-i: Preparation of a metal to be coated.

Zinc-electroplated steel plates (coating weight: 20/20 g/m²) degreased with Fine Cleaner 4336 (supplied by Nihon Parkerizing Co., Ltd.) and nickel-zinc alloy-plated steel plates (coating weight: 20/20 g/mz) were roll-coated with Zinchrom R1415A (supplied by Nihon Parkerizing Co., Ltd.) and dried at an ambient temperature of 360° C. for 10 seconds (attained plate temperature: 100° C.) to give chromate-treated plates having a chromium coating weight of 50 mg/m².

(2)-ii: Application of the present compositions and application of the comparative compositions (Examples and Comparative Examples).

The chromate treated plates prepared in (2)-i were bar-coated with the compositions shown in Table 1, and dried at an ambient temperature of 360° C. for 30 seconds (attained plate temperature: 210° C.). Table 2 shows performances of the treated plates coated with the present compositions and the treated plated coated with the comparative compositions. FIG. 1 shows the relationship between the dry coating weight of the nonaqueous coating composition and performance when said coating composition is the present composition No. 1 in Table 1 and the metal material is a zinc-electroplated steel.

(3) Tes method and evaluation standard (without an overcoating).

(3)-i: Formability (deep draw test)

A swift deep draw test (draw ratio: 2.45) was carried out with a deep draw tester (TF-102-12, supplied by Tokyo Koki) under the conditions that the blank diameter was 98 mmφ, the punch diameter was 40 mmφ and the wrinkle pressing pressure was 1.0 t. The test results were evaluated on the basis of the following ratings.

◯: drawn through, free from any build up phenomenon, etc.

×: not drawn through (3)-ii: Corrosion resistance

Samples were subjected to a salt water spraying test according to JIS Z-2371, and evaluated on a state of a white result occurrence after test periods of 500 hours and 1,000 hours.

◯: A white rust occurred in less than 10% of a whole area.

Δ: A white rust occurred in 10 to 30% of a whole area.

×: A white rust occurred in more than 30% of a whole area.

(3)-iii Weldability

Films were measured for an interlayer resistance under the following conditions. A measuring apparatus: Core-Plate Enamel Tester (supplied by Gardner Associates, Inc.), a voltage applied: 0.5 V, a load: 150 g. The results were evaluated on the basis of the following ratings.

◯: interlayer resistance: not more than 6.0 Ω.cm².

×: interlayer resistance: more than 6.0 Ω.cm².

(3)-iv: Electrodepositability

A cationic electrodeposition coating composition was applied and baked under the following conditions, and the resultant appearance was evaluated by the eyes.

Coating composition: HB-2000L, supplied by Kansai Paint Co., Ltd., a coating thickness: 20 μm.

Electrodeposition conditions: Interelectrode distance: 15 cm, voltage applied: 350 V, liquid temperature: 25° C., application time: 2 minutes.

Baking: 175° C. × 30 minutes, test piece: 1.05 dm².

◯: A test piece was free from failure such as a pinhole, etc.

Δ: A test piece slightly had failure such as pinholes, etc., (less than 10 places).

×: A test piece has failure such as pinholes, etc. (10 places or more).

(4) Test method and evaluation standard (with an overcoating).

Treated plates coated with the present coating composition and treated plates coated with the comparative compositions, all prepared in the same way as in (2)-ii, were overcoated as follows, and tested on coating performances.

(4)-i: Overcoating

Coating 1: Delicon #700 (supplied by Dainippon Paint K.K.), amino-alkyd type, coating thickness: 30

μm, coating method: bar-coating. baking: 140° C. × 20 minutes.

Coating 2: The same cationic electrodeposition coating composition as that described in the above (3)-iv was applied.

(4)-ii: Adhesion to an overcoating

The above coating 1 was crosscut at intervals of 1 mm to form 100 of square forms, a sample was pressed 5 mm down with an Erichsen testing machine, the tape was applied and peeled off, and remaining square forms were counted.

○: number of remaining square forms — 100 to 90
×: number of remaining square forms — 89 or less The above coating 2 was crosscut at intervals of 1 mm to form 100 square forms, a tape was applied thereon and peeled off, and remaining square forms were counted. The evaluation ratings were the same as those for the coating 1.

(4)-iii: Corrosion resistance

The coating was cut with a cutter as deep as the cutter reached a substrate, and subjected to a salt water spraying test according to JIS Z-2371. A rust was measured for a maximum rust width (mm) from the cut portion after test periods of 500 hours and 1,000 hours.

○: maximum rust width in one direction—not more than 10 mm.
×: maximum rust width in one direction — 10 mm or more.

As is shown in Table 2, the present compositions were excellent in formability, and also excellent in corrosion resistance and adhesion to an overcoating. Of the present compositions, the composition No. 3 exhibited excellent corrosion resistance, and when it was subjected to the salt water spraying test without any overcoating, no white rust occurred after the test period of 500 hours in the case of the zinc-electroplated steel plate and after the test period of 1,000 hours in the case of the nickel-zinc alloy-plated steel plate. Nonaqueous coating compositions of the second embodiment, prepared by incorporating coating compositions of the first embodiment, exhibited further improved corrosion resistance after a test period of 1,000 hours as compared with the compositions of the first embodiment. In addition, all of the present compositions had sufficient stain resistance to finger marks.

On the other hand, the comparative composition No. 9, which is an example using carnauba wax as a formability improver, exhibited good formability, but it was inferior in adhesion to an overcoating and corrosion resistance after coated. The comparative compositions Nos. 10 to 14 are examples using a formability improver outside the scope of this invention, and the comparative compositions Nos. 10 to 13 were inferior in both formability and adhesion. The comparative composition No. 14 exhibited good formability, but it was inferior in adhesion. The comparative compositions Nos. 15-17 are examples using a resin other than a urethane resin, and these comparative compositions were inferior in formability even if a polyethylene wax was incorporated as a formability improver.

As explained above, the composition of this invention makes it possible to form a metal without applying a press oil, etc., and impart a metal with corrosion resistance, adhesion to an overcoating and resistance to stains such as finger marks. Thus, in metal working and metal coating fields, a great merit of omitting steps can be obtained.

Further, a metal coated with the composition of this invention in a coating weight of a dry film of 0.5 to 3.0 g/m$^2$ exhibits not only the above properties but also excellent electrodepositability and weldability. Thus, metal working and metal coating fields can be provided with a great merit.

TABLE 1

Present compositions and comparative compositions

| | Composition No. | Organic resin | | Formability improver | | Rust preventer | |
|---|---|---|---|---|---|---|---|
| | | kind | amount[*1] | kind | amount | kind | amount |
| The invention | 1 | Urethane resin I[*2] | 80 | Paraffin wax[*3] | 20 | — | — |
| | 2 | Urethane resin I[*2] | 80 | Polyethylene wax[*4] | 20 | — | — |
| | 3 | Urethane resin I[*2] | 60 | Polyethylene wax[*4] | 20 | silica[*5] | 20 |
| | 4 | Urethane resin I[*2] | 80 | Fatty acid amide[*6] | 20 | — | — |
| | 5 | Urethane resin II[*7] | 80 | Polyethylene wax[*4] | 20 | — | — |
| | 6 | Urethane resin I[*2] | 80 | Paraffin wax[*3] | 10 | — | — |
| | | | | Polyethylene wax[*4] | 10 | | |
| | 7 | Urethane resin I[*2] | 80 | Polyethylene wax[*4] | 10 | — | — |
| | | | | Fatty acid amide[*6] | 10 | | |
| | 8 | Urethane resin I[*2] | 70 | Paraffin wax[*3] | 10 | — | — |
| | | | | Polyethylene wax[*4] | 10 | | |
| | | | | Fatty acid amide[*6] | 10 | | |
| Comparative composition | 9 | Urethane resin I[*2] | 80 | Carnauba wax[*8] | 20 | — | — |
| | 10 | Urethane resin I[*2] | 80 | Micro wax[*9] | 20 | — | — |
| | 11 | Urethane resin I[*2] | 80 | Montanic ester[*10] | 20 | — | — |
| | 12 | Urethane resin I[*2] | 80 | Molybdenum disulfide[*11] | 20 | — | — |
| | 13 | Urethane resin I[*2] | 80 | Boron nitride[*12] | 20 | — | — |
| | 14 | Urethane resin I[*2] | 80 | PTFE[*13] | 20 | — | — |
| | 15 | Epoxy resin[*14] | 80 | Polyethylene wax[*4] | 20 | — | — |
| | 16 | Acrylic resin[*15] | 80 | Polyethylene wax[*4] | 20 | — | — |

TABLE 1-continued

Present compositions and comparative compositions

| Composition No. | Organic resin kind | amount*1 | Formability improver kind | amount | Rust preventer kind | amount |
|---|---|---|---|---|---|---|
| 17 | Polyester resin*16 | 80 | Polyethylene wax*4 | 20 | — | — |

*1 Solid content ratio in composition (%)
*2 Mitec Coat BL 100 (Mitsubishi Chemical Co., Ltd.)
*3 155, dispersion solvent: ethyl acetate (Nippon Seiro K.K.)
*4 Mitsui Highwax 220P, dispersion solvent: toluene (Mitsui Petrochemical Industries, Ltd.)
*5 XBA-ST, organosilica sol (Nissan Chemical Industries, Ltd.)
*6 Amide-6S, dispersion solvent: butyl cellosolve (Kawaken Fine Chemical K.K.)
*7 Elastron M-2164, a urethane resin containing blocked isocyanate (Dai-ichi Kogyo Pharmaceutical Ind.)
*8 Carnauba wax No. 1, dispersion solvent: butyl cellosolve (K.K. Kato Yoko)
*9 Hi-Mic-1080, dispersion solvent: butyl cellosolve (Nippon Seiro K.K.)
*10 Hoechst Wax E, dispersion solvent: butyl cellosolve (Hoechst Japan, K.K.)
*11 Molybdenum disulfide powder, average particle diameter: 0.8 μm
*12 Boron nitride powder, average particle diameter: 5-10 μm
*13 Tetrafluoroethylene powder, particle diameter: not more than 12 μm
*14 Epokey-802-30CX (Mitsui Toatsu Chemicals, Inc.)
*15 Almatex 749-17AE (Mitsui Toatsu Chemicals, Inc.), acrylic resin containing, as a curing agent, 23% by weight (solid content ratio) of U Van 20SE60 (amino resin, Mitsui Toatsu Chemicals, Inc.) and 13% by weight (solid content ratio) of Epikote 1001 (epoxy resin, Uka Shell K.K.)
*16 Almatex P646 (Mitsui Toatsu Chemicals, Inc.), polyester resin containing, as a curing agent, 10% by weight (solid content ratio) of U Van 20SE60 and 5% by weight (solid content ratio) of Epikote 1001.

TABLE 2

Performances of metals coated with the present compositions and metals coated with comparative compositions

| | | Coating composition | | Without overcoating | | | | | With overcoating | | |
|---|---|---|---|---|---|---|---|---|---|---|---|
| | | | Dry film coating | | Corrosion resistance | | | Electro- | | Adhesion | Corrosion resistance |
| | Metal | Composition No | weight (g/²) | Forma-bility | 500 hours | 1000 hours | Weld-ability | deposit-ability | Overcoating composition | to over-coating | 500 hours | 1000 hours |
| Embodiment of this invention | Zinc-electro-plated steel plate | 1 | 1 | ○ | ○ | X | ○ | — | A*1 | ○ | ○ | X |
| | | 1 | 2 | ○ | ○ | X | ○ | — | A*1 | ○ | ○ | X |
| | | 2 | 1 | ○ | ○ | X | ○ | — | A*1 | ○ | ○ | X |
| | | 3 | 1 | ○ | ○ | Δ | ○ | — | A*1 | ○ | ○ | X |
| | | 4 | 1 | ○ | ○ | X | ○ | — | A*1 | ○ | ○ | X |
| | | 5 | 1 | ○ | ○ | X | ○ | — | A*1 | ○ | ○ | X |
| | | 6 | 1 | ○ | ○ | X | ○ | — | A*1 | ○ | ○ | X |
| | | 7 | 1 | ○ | ○ | X | ○ | — | A*1 | ○ | ○ | X |
| | | 8 | 1 | ○ | ○ | X | ○ | — | A*1 | ○ | ○ | X |
| | Nickel-zinc alloy-plated steel plate | 1 | 1 | ○ | ○ | ○ | ○ | ○ | B*2 | ○ | ○ | ○ |
| | | 1 | 2 | ○ | ○ | ○ | ○ | ○ | B*2 | ○ | ○ | ○ |
| | | 2 | 1 | ○ | ○ | ○ | ○ | ○ | B*2 | ○ | ○ | ○ |
| | | 3 | 1 | ○ | ○ | ○ | ○ | ○ | B*2 | ○ | ○ | ○ |
| | | 4 | 1 | ○ | ○ | ○ | ○ | ○ | B*2 | ○ | ○ | ○ |
| | | 5 | 1 | ○ | ○ | ○ | ○ | ○ | B*2 | ○ | ○ | ○ |
| Comparative Example | Zinc-electro-plated steel plate | 9 | 1 | ○ | ○ | X | ○ | — | A*1 | X | X | X |
| | | 10 | 1 | X | ○ | X | ○ | — | A*1 | X | ○ | X |
| | | 11 | 1 | X | ○ | X | ○ | — | A*1 | X | ○ | X |
| | | 12 | 1 | X | ○ | X | ○ | — | A*1 | X | ○ | X |
| | | 13 | 1 | X | ○ | X | ○ | — | A*1 | X | ○ | X |
| | | 14 | 1 | ○ | ○ | X | ○ | — | A*1 | X | ○ | X |
| | | 15 | 1 | X | ○ | X | ○ | — | A*1 | ○ | ○ | X |
| | | 16 | 1 | X | ○ | X | ○ | — | A*1 | ○ | ○ | X |
| | | 17 | 1 | X | ○ | X | ○ | — | A*1 | ○ | ○ | X |

*1 ... A: Baking type aminoalkyd coating composition
*2 ... B: cationic electrodeposition coating composition
—: not carried out

What is claimed is:

1. A nonaqueous coating composition consisting essentially of:
   (1) a urethane resin
   (2) at least one formability improver selected from a paraffin wax, a polyethylene wax, a fatty acid amide, a fatty acid amide derivative, and
   (3) an organic solvent suitable for diluting or dispersing said urethane resin and said formability improver; said resin, improver and solvent being such that and being present in amount such that said composition solidifies upon heating and has sufficient formability-improving, elongation and adhesion properties whereby it can effectively form, upon solidification by heating, a coating on the surface of a metal to be treated or on a film formed on the surface of a metal to be treated.

2. A composition according to claim 1, which comprises, based on a total solid content, 60 to 97% by weight, as a solid, of the urethane resin, and 3 to 40% by weight, as a solid, of at least one formability improver selected from the paraffin wax, the polyethylene wax, the fatty acid amide and the fatty acid amide derivative.

3. A composition according to claim 1, wherein the urethane resin is a blocked isocyanate group-containing urethane resin containing at least one blocked isocyanate group, at least one hydroxyl group and at least one tertiary amino group in one molecule.

4. A composition according to claim 2, wherein the urethane resin is a blocked isocyanate group-containing urethane resin containing at least one blocked isocyanate group, at least one hydroxyl group and at least one tertiary amino group in one molecule.

5. A nonaqueous coating composition consisting essentially of
 (1) a urethane resin
 (2) at least one formability improver selected from a paraffin wax, a polyethylene wax, a fatty acid amide, a fatty acid amide derivative,
 (3) silia, and
 (4) an organic solvent suitable for diluting or dispersing said urethane resin and said formability improver; said resin, improver and solvent being such that and being present in amount such that said composition solidifies upon heating and has sufficient formability-improving, elongation and adhesion properties whereby it can effectively form, upon solidification by heating, a coating on the surface of a metal to be treated or on a film formed on the surface of a metal to be treated, said silica being present in said composition in an amount sufficient to improve the corrosion resistance of the composition without substantially impairing the formability of said coating.

6. A composition according to claim 5, which comprises, based on a total solid content, 50 to 94% by weight, as a solid, of the urethane resin, 3 to 40% by weight, as a solid, of at least oen formability improver selected from the paraffin wax, the polyethylene wax, the fatty acid amide and the fatty acid amide derivative, and 3 to 40% by weight, as a solid, of the silica.

7. A composition according to claim 5, wherein the urethane resin is a blocked isocyanate group-containing urethane resin containing at least one blocked isocyanate group, at least one hydroxyl group and at least one tertiary amino group in one molecule.

8. A composition according to claim 6, wherein the urethane resin is a blocked isocyanate group-containing urethane resin containing at least one blocked isocyanate group, at least one hydroxyl group and at least one tertiary amino group in one molecule.

9. A coated metal having a coating weight of 0.5 to 3.0 g/m$^2$ of a dry film formed by coating a surface of a metal with a nonaqueous coating composition consisting essentially of, based on a total solid content, 60 to 97% by weight, as a solid, of a urethane resin, 3 to 40% by weight, as a solid, of at least one formability improver selected from a paraffin wax, a polyethylene wax, a fatty acid amide and a fatty acid amide derivative, and an organic solvent suitable for diluting or dispersing said urethane resin and said formability improver; and drying the resultant coating.

10. A coated metal according to claim 9, wherein the urethane resin is a blocked isocyanate group-containing urethane resin containing at least one blocked isocyanate group, at least one hydroxyl group and at least one tertiary amino group in one molecule.

11. A coated metal according to claim 9, wherein the surface of the metal is a surface of a metal which is in advance subjected to phosphate treatment, chromate treatment or anodic treatment.

12. A coated metal according to claim 10, wherein the surface of the metal is a surface of a metal which is in advance subjected to phosphate treatment, chromate treatment or anodic treatment.

13. A coated metal having a coating weight of 0.5 to 3.0 g/m$^2$ of a dry film formed by coating a surface of a metal with a nonaqueous coating composition consisting essentially of, based on a total solid content, 50 to 94% by weight, as a solid, of a urethane resin, 3 to 40% by weight, as a solid, of at least one formability improver selected from a paraffin wax, a polyethylene wax, a fatty acid amide and a fatty acid amide derivative, 3 to 40% by weight of silica and an organic solvent suitable for diluting or dispersing said urethane resin and said formability improver, and drying the resultant coating.

14. A coated metal according to claim 13, wherein the urethane resin is a blocked isocyanate group-containing urethane resin containing at least one blocked isocyanate group, at least one hydroxyl group and at least one tertiary amino group in one molecule.

15. A coated metal according to claim 13, wherein the surface of the metal is a surface of a metal which is in advance subjected to phosphate treatment, chromate treatment or anodic treatment 16. A coated metal according to claim 14, wherein surface of the metal is a surface of a metal which is in advance subjected to phosphate treatment, chromate treatment or anodic treatment.

* * * * *